United States Patent [19]

Krishan

[11] 4,288,661
[45] Sep. 8, 1981

[54] INTERFACE CIRCUITRY FOR ACOUSTIC COUPLER COMPENSATION

[75] Inventor: Baldev Krishan, San Jose, Calif.

[73] Assignee: Anderson Jacobson, Inc., San Jose, Calif.

[21] Appl. No.: 13,021

[22] Filed: Feb. 21, 1979

[51] Int. Cl.³ .......................................... H04M 11/00
[52] U.S. Cl. .................................................... 179/2 C
[58] Field of Search ................. 179/2 A, 2 C, 2 DP, 179/1 C, 3, 4; 364/200, 900 MS File; 178/3

[56] References Cited

U.S. PATENT DOCUMENTS 3,535,456 10/1970 Wilson .............................. 179/2 C
3,808,369 4/1974 Libby ................................. 179/1 C
4,100,373 7/1978 Perkins ............................. 179/2 C Primary Examiner—Joseph A. Popek
Attorney, Agent, or Firm—Limbach, Limbach & Sutton

[57] ABSTRACT

For the type of modem that transmits information by way of quadrature amplitude modulation (QAM) over a telephone line, an electronic circuit for compensating for amplitude distortion created by use of an acoustic coupler with an ordinary telephone handset.

The circuit is positioned in the acoustic coupler between the modem and the coupler's microphone and receiver. This circuit compensates for amplitude distortion introduced by the acoustic coupling within the data transmission frequency bands of the modem.

7 Claims, 1 Drawing Figure

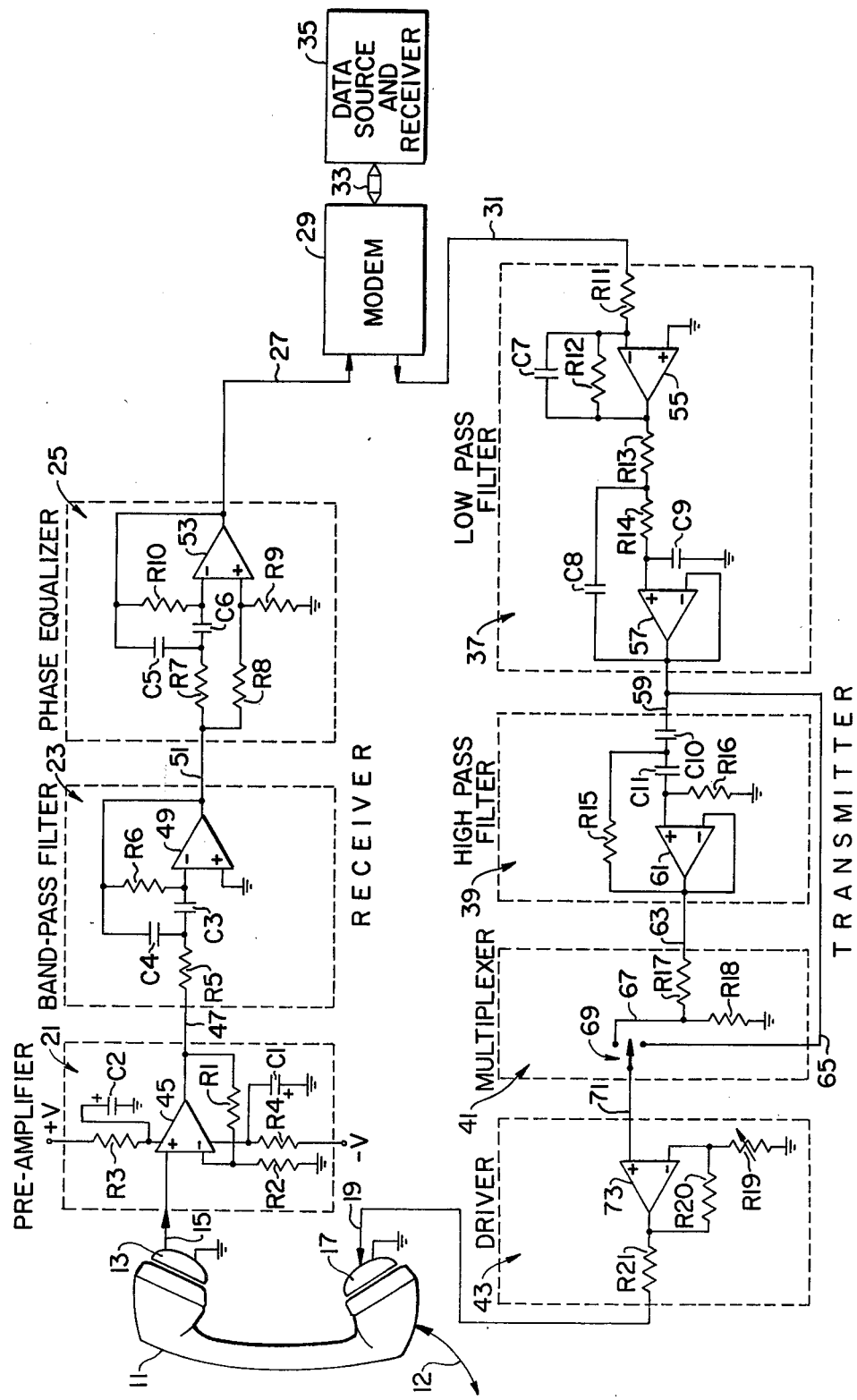

INTERFACE CIRCUITRY FOR ACOUSTIC COUPLER COMPENSATION

BACKGROUND OF THE INVENTION

This invention relates to acoustical couplers adapted to communicate through ordinary telephone handsets computer or other data from a modem, and particularly relates to compensation techniques therefor.

It is a standard technique for a central computer or other data center to have one or more terminals at a location remote from that of the data source. The use of existing telephone circuits is often the most convenient and least expensive way of communicating between the data center and the remote terminals. A telephone circuit is connected to the data source at the data center through a modem which conditions and translates the computer digital data into a form which can be carried by ordinary telephone lines, given their limitations. A matching modem is utilized at each remote terminal.

One such modem type is manufactured and sold by the Racal-Vadic Corporation, their number VA 3400, which is the subject matter of U.S. Pat. No. 3,937,882—Bingham (1976). Such a modem for the terminal locations is adapted for transmitting and receiving information from the telephone line at two distinct frequency bands, so called upper and lower bands. The upper frequency band is used for passing data signals in one direction and the lower frequency band is used for passing data signals in the other direction. This freqency band division with quadrature amplitude modulation and dibit phase encoding helps achieve 1200 bps. full duplex operation on the telephone lines. The modems themselves are designed for direct electrical connection to the telephone line and contain circuitry to compensate for the limitations and nonlinearities of the telephone line.

It is often desirable to use at the terminal location an acoustical coupler wherein the modem signal is coupled to the telephone line through an ordinary handset of a telephone, rather than being electrically wired to the telephone line. This is accomplished by providing an acoustical coupler with a microphone and speaker for resting against, respectively, the receiver and transmitter of the telephone handset. This acoustic coupling introduces further nonlinearities in the data transmission path and it is a principal object of the present invention to provide an electronic circuit to compensate for such nonlinearities in order to have a reliable acoustic coupler compatible with modems using QAM techniques.

SUMMARY OF THE INVENTION

Briefly, this and additional objects are accomplished by a compensating circuit provided in the acoustic coupler between its microphone and receiver, and the modem. This circuit compensates for amplitude distortion within the data transmission frequency bands that are introduced by the acoustic coupling. The signal frequencies within the band that are passed through the acoustic coupling with the greatest loss relative to other frequencies within the band are attenuated by the compensating circuit so that their level will be the same as the other signal frequencies. The entire band is then amplified equally so that the remote terminal modem is coupled to the telephone line as if the amplitude distortion of the acoustic coupling does not exist. Such amplitude distortion must be compensated or data transmission becomes completely unacceptable at high data speeds such as 1200 bps.

Additional objects, advantages and features of the present invention will become apparent in the following description of its preferred embodiment, which should be taken in conjunction with the accompanying drawing.

BRIEF DESCRIPTION OF THE DRAWING

The accompanying drawing is a schematic diagram of a preferred electronic compensating circuit for an acoustic coupler, showing its interaction with a telephone handset and a data transmission modem.

DESCRIPTION OF A PREFERRED EMBODIMENT

Referring to the drawing, an ordinary telephone handset 11 is connected to a telephone line through its cord 12. An acoustic coupler unit is provided with a receptacle (not shown) in which the handset 11 is rested. The acoustic coupler receives a handset 11 so that sound receiver is placed in close physical contact with a microphone 13 installed within the coupler. It is desired that the electrical signal in the telephone line being sent in the direction of the terminal be reproduced in a line 15 from the microphone 13 as faithfully as possible. Similarly, the handset is held with its transmitter in close physical contact with a speaker 17 of the acoustical coupler. It is desired that the electrical signal in a line 19 which drives the speaker 17 be introduced into the telephone circuit as faithfully as possible.

But because there are nonlinearities between these two acoustic couplings, a receiver compensating circuit is provided that includes a preamplifier 21 connected to the line 15 in order to receive the output of the microphone 13. The preamplifier 21 is connected to a band pass filter 23 and then in series with a phase equalizer 25. An output of the phase equalizer 25 in a line 27 is then applied to a modem 29. The modem 29 is of a type previously described that is manufactured and sold by the Racal-Vadic Corporation. The specific compensation circuit being described has been successfully operated with such a modem. The use of this particular modem means that the information being received over the telephone circuit is carried by a frequency (lower) band which lies between 850 Hz and 1450 Hz. The modem 29 converts the information within this band into digital data form in a line 33 to a CRT screen, computer or other receiver that is part of the data source and receiver 35.

A keyboard, computer or other digital data source as part of the data source and receiver 35 in turn generates a digital signal in a line 33 that is desired to be transmitted back over the telephone line to the remote data location. The modem 29 receives this digital information and converts it into a signal which lies within a frequency band between 1950 Hz and 2550 Hz in a line 31. The line 31 is then applied to a transmitter compensation circuit which includes a low pass filter 37, a high pass filter 39, a multiplexer 41 and a driver 43, all in series. An output of the driver 43 is applied to the line 19 to drive the speaker 17 for inserting into the telephone line 12 the information within the 1950 Hz and 2550 Hz band with signal levels that are substantially the same as if the output 31 of the modem 29 had been hard wired into the telephone circuit 12.

The receiver compensation circuits will now be described in more detail. The output line 15 from the microphone 13 is applied to a non-inverting input of an operational amplifier 45. An output line 47 of the amplifier 45 is connected through a feedback resistor R1 to the amplifier's inverting input. The inverting input is also connected to ground potential through a bias resistor R2. A decoupling circuit formed of a resistor R3 and capacitor C2 is provided in the positive voltage supply line to the amplifier 45. Similarly, a decoupling circuit of a resistor R4 and a capacitor C1 is provided in the negative voltage supply line. A 1458 type of operational amplifier is suitable for the amplifier 45 and all others of those shown in the drawing.

The preamplifier 21 just described has a purpose of amplifying the incoming signals within the 850 Hz to 1450 Hz frequency band with substantially equal amplification in order to overcome the losses that those signals will incur as a result of the acoustic coupling. The amplified signal in the line 47 is connected to an inverting input of an operational amplifier 49 through a series circuit of a resistor R5 and capacitor C3. A feedback resistor R6 is provided between the inverting input of the amplifier 49 and its output 51. Also, a capacitor C4 is provided between a junction of the resistor R5 and capacitor C3, and the output 51. The non-inverting input of the amplifier 49 is connected to ground potential. The circuit shown for the band-pass filter 23 is one of many possible circuits designed to provide about 6 db. of gain at 850 Hz. as compared to the signal level at 1450 Hz., affecting substantially linearly other frequencies within the lower band between these extreme frequencies.

Because the circuit 23 imparts some phase distortion to the signals of interest and since information is coded thereon by the system of the modem 29 which in part looks at the relative phases of the signals within the lower band (850 Hz and 1450 Hz), a phase equalizer 25 is provided. The particular circuit shown includes an operational amplifier 53 whose inverting input is connected to the line 51 through a series circuit of a resistor R7 and capacitor C6. The non-inverting input of the amplifier 53 is connected through a resistance R8 to the line 51. The non-inverting input of the amplifier 53 is also connected to ground potential through a resistor R9. A feedback resistor R10 is connected between the inverting input of the amplifier 53 and it output, line 27. A capacitor C5 is connected between the line 27 and a junction between the resistor R7 and the capacitor C6.

The transmitter compensating circuit includes two filters 37 and 39 which are selectively engaged upon installation of the acoustic coupler through a multiplexer 41 depending upon the particular telephone handset transmitter that is being utilized. Different transmitters, when used in combination with the speaker 17, provide different levels of amplitude distortion as between the transmitter signals within the upper band between 1950 Hz and 2550 Hz. Two different levels of amplitude compensation are provided by the transmitter compensating circuits as shown in the figure and it has been found that the amplitude distortion caused by nearly all handset transmitters in use today may be compensated by the circuit shown in the figure.

A low pass filter 37 is of a three pole type and attenuates the 2550 Hz signal by about 3 db. more than the 1950 Hz signal, affecting other frequencies substantially linearly within this upper band between these extreme frequencies. A first operational amplifier 55 has the input line 31 connected to its inverting input through a series resistance R11. A feedback network of parallel resistor R12 and capacitor C7 are connected between the inverting input of the amplifier 55 and its output. Its non-inverting input is connected to ground potential. The output of the amplifier 55 is connected to a non-inverting input of a second operational amplifier 57 through series resistances R13 and R14. An output 59 of the amplifier 57 is connected directly to its inverting input and through a capacitor C8 to a junction between a series resistances R13 and R14. A capacitor C9 is connected between the non-inverting input of the amplifier 57 and ground potential.

The high pass filter 39 increases the amplitude of the 2550 Hz signal by about 7 db. more than the 1950 Hz signal tone in order to compensate for other types of amplitude distortion as a result of the acoustical coupling. The filter 39 affects other frequencies an amount substantially linearly related to the attenuation at these extreme frequencies of the upper band. The filter 39 receives the output signal at a line 59 from the low pass filter 37 and produces at an output line 63 a signal wherein the 2550 Hz tone has been increased by about 4 db. more than the 1950 Hz tone from the point where these two signal tones are introduced at the input line 31 to the low pass filter 37. It is convenient to use such a combustion of filters in order to obtain the combined effect at the output line 63, rather than using a completely different filter circuit from that of the low pass filter 37, and results in the saving of electronic components.

The high pass filter 39 utilizes an operational amplifier 61 whose non-inverting input is connected to the line 59 through series capacitors C10 and C11. The non-inverting input of the amplifier 61 is also connected through resistance R16 to ground potential. The inverting input of the amplifier 61 is connected to its output line 63. A feedback resistance R15 is connected between the amplifier output and the junction between the capacitances C10 and C11.

The multiplexer circuit 41 has as its main component a semiconductor switching circuit shown for simplicity as a single pole, double position switch 69. An output line 71 of the multiplexer 41 may, through the switch 69, be connected directly to the output of the low pass filter 37 through a line 65, thereby bypassing the filter 39, or may be connected to a line 67 which obtains the signal to be transmitted over the telephone line after processing by both of the filters 37 and 39. The signal in the line 67 is obtained from that in the line 63 through a voltage divider formed of resistances R17 and R18 that are connected in series between the line 63 and ground potential. The line 67 is connected to the junction between the resistances R17 and R18.

The selected signal in the line 71 is then applied to an amplifying circuit 43 in order to drive the speaker 19 and otherwise compensate for losses in the filter circuit and to guarantee some fixed tranmit level on the line. The amplifying circuit 43 equally amplifies the signal within the 1950 Hz to 2550 Hz band. An operational amplifier 73 has the line 71 connected directly to its non-inverting input while an output of the amplifier 73 is connected through a resistance 21 to the output line 19. A feedback resistance R20 is connected between the amplifier output and its inverting input. A gain adjustment potentiometer R19 is provided between ground potential and the inverting input of the amplifier 73.

The low pass filter 37 serves an additional function of filtering out all noise above 2550 Hz. Such higher frequency noise is emitted by the type of modem 29 that is being considered in this discussion.

Specific values for the resistances and capacitors in the specific example having been described with respect to the drawings are as follows:

| | |
|---|---|
| R1 - 154 K ohms | C1 - 10 uf |
| R2 - 12.7 K ohms | C2 - 10 uf |
| R3 - 100 ohms | C3 - 3300 pf |
| R4 - 100 ohms | C4 - 3300 pf |
| R5 - 18.7 K ohms | C5 - 3300 pf |
| R6 - 169 K ohms | C6 - 3300 pf |
| R7 - 9.31 K ohms | C7 - 3300 pf |
| R8 - 45.3 K ohms | C8 - 0.033 uf |
| R9 - 137 K ohms | C9 - 0.01 uf |
| R10 - 113 K ohms | C10 - 3300 pf |
| R11 - 16.5 K ohms | C11 - 3300 pf |
| R12 - 24.9 K ohms | |
| R13 - 5.36 K ohms | |
| R14 - 2.94 K ohms | |
| R15 - 2.87 K ohms | |
| R16 - 127 L ohms | |
| R17 - 1.0 K ohms | |
| R18 - 1.0 K ohms | |
| R19 - 20 K ohm potentiometer | |
| R20 - K ohms | |
| R21 - 47 ohms | |

Thus, a specific amplitude compensation circuit for an acoustic coupler has been described in considerable detail. Acoustic distortion between the microphone 13 and nearly all handset receivers is compensated for the frequency band within the two specific incoming tones that are utilized by the modem 29. Amplitude distortion between the speaker 17 and nearly all telephone handset transmitters is provided to be of two types for two different types of handset transmitters, namely a 3 db. amplitude correction in one direction when the switch 69 is in one position and a 4 db. net correction in the other direction when the switch 69 is in its second position.

Although the present invention has been described with respect to a specific embodiment thereof, it will be understood that the invention is entitled to protection within the full scope of the appended claims.

I claim:

1. For an acoustic coupler that comprises,
   a microphone adapted to receive from a telephone handset receiver an acoustic signal in a band between first and second distinct frequencies and to apply the received signal in an electronic form to a modem, and
   a speaker adapted to acoustically transmit to a telephone handset transmitter a signal received in an electronic form from a modem in a band between third and fourth distinct frequencies,
   an electronic interface circuit adapted to be connected between the modem and the coupler microphone and speaker for compensation of unequal amplitude acoustic coupling between a telephone handset and the coupler microphone and speaker of the various distinct frequency signals, said interface circuits comprising,
   first means receiving electrical signals from said microphone before applying them to the modem for compensating for any unequal amplitude transmittance between said handset receiver and said coupler microphone of acoustic tone signals within said first and second distinct frequency band, said first means including a filter that attenuates one of said first and second frequency bands more than the other and means for equalizing any phase distortion introduced by said filter, and
   second means adapted to receiving electrical signals from said modem and apply them to the coupler speaker for compensating for any unequal amplitude transmittance between said coupler speaker and said handset receiver of acoustic tone signals within said third and fourth distinct frequency band.

2. The acoustic coupler interface circuit according to claim 1 wherein said second means includes in tandem both a high pass filter and a low pass filter, the high pass filter being switchable out of the circuit, whereby required compensation may be had where the third frequency signal is higher than the fourth frequency signal or where the fourth frequency signal is higher than the third frequency signal.

3. The acoustic coupler interface circuit according to claim 1 wherein said modem is of a type utilizing quadrature amplitude modulation.

4. The acoustic coupler interface circuit according to claim 3 wherein said modem is characterized by operating with a data rate of approximately 1200 b.p.s.

5. The acoustic coupler interface circuit according to claim 1 wherein said first means includes only a single stage band-pass filter.

6. For an acoustic coupler that comprises,
   a microphone adapted to receive from a telephone handset receiver an acoustic signal including signals in a first band substantially between 850 Hz and 1450 Hz and to apply the received signal in an electronic form to a modem, and
   a speaker adapted to acoustically transmit to a telephone handset transmitter a signal received in an electronic form from a modem that includes signals in a second band substantially between 1950 Hz and 2550 Hz,
   an electronic interface circuit adapted to be connected between the modem and the coupler microphone and speaker for compensation of unequal amplitude acoustic coupling between a telephone handset and the coupler microphone and speaker of the various frequency signals within said first and second bands, said interface circuits comprising:
   first means receiving electrical signals from said microphone before applying them to the modem for shifting the relative amplitude levels of the 850 Hz. and 1450 Hz. frequency limits of said first band approximately 6 db. apart with the 1450 Hz. tone signal being at the lower amplitude, other signal frequencies within said first band being shifted in relative amplitude amounts proportional to frequency, and
   second means adapted to receive electrical signals from the modem and apply them to the coupler speaker for selectively shifting the relative amplitude levels of the 1950 Hz. and 2550 Hz. limits of said second band either approximately 3 db. apart with the 2550 Hz. frequency signal being at the lower amplitude or approximately 4 db. apart with the 1950 Hz. tone signal being at the lower amplitude, other freqencies within said second band in either case being shifted in relative amplitude amounts proportional to frequency, whereby the coupler may be used with telephone handset transmitters of different characteristics.

7. For an acoustic coupler that comprises, a microphone adapted to receive from a telephone handset receiver an acoustic signal in a band between first and second distinct frequencies and to apply the received signal in an electronic form to a modem, and a speaker adapted to acoustically transmit to a telephone handset transmitter a signal received in an electronic form from a modem in a band between third and fourth distinct frequencies, an electronic interface circuit adapted to be connected between the modem and the coupler microphone and speaker for compensation of unequal amplitude acoustic coupling between a telephone handset and the coupler microphone and speaker of the various distinct frequency signals, said interface circuits comprising, first means receiving electrical signals from said microphone before applying them to the modem for compensating for any unequal amplitude transmittance between said handset receiver and said coupler microphone of acoustic tone signals within said first and second distinct frequency band, and second means adapted to receiving electrical signals from said modem and apply them to the coupler speaker for compensating for any unequal amplitude transmittance between said coupler speaker and said handset receiver of acoustic tone signals within said third and fourth distinct frequency band, said second means including in tandem both a high pass filter and a low pass filter, the high pass filter being switchable out of the circuit, whereby required compensation may be had where the third frequency signal is higher than the fourth frequency signal or where the fourth frequency signal is higher than the third frequency signal.

* * * * *